US008983473B2

(12) United States Patent
Murakami et al.

(10) Patent No.: US 8,983,473 B2
(45) Date of Patent: Mar. 17, 2015

(54) RADIO BASE STATION AND HANDOVER CONTROL METHOD IN A MULTI-SYSTEM ENVIRONMENT

(75) Inventors: Keiji Murakami, Kanagawa (JP); Hirokazu Matsunami, Kanagawa (JP); Kyoko Fujito, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 129 days.

(21) Appl. No.: 13/387,564

(22) PCT Filed: Jul. 26, 2010

(86) PCT No.: PCT/JP2010/062643
§ 371 (c)(1),
(2), (4) Date: Jan. 27, 2012

(87) PCT Pub. No.: WO2011/013678
PCT Pub. Date: Feb. 3, 2011

(65) Prior Publication Data
US 2012/0122457 A1    May 17, 2012

(30) Foreign Application Priority Data

Jul. 27, 2009  (JP) .................................. 2009-174697

(51) Int. Cl.
*H04W 36/00*  (2009.01)
*H04W 36/26*  (2009.01)
*H04W 36/14*  (2009.01)
*H04W 88/06*  (2009.01)

(52) U.S. Cl.
CPC .......... *H04W 36/26* (2013.01); *H04W 36/0055* (2013.01); *H04W 36/14* (2013.01); *H04W 88/06* (2013.01)
USPC ............ 455/438; 455/436; 455/561; 370/331

(58) Field of Classification Search
USPC .................... 455/436–444; 370/331–334
See application file for complete search history.

(56) References Cited

U.S. PATENT DOCUMENTS

2008/0310371 A1* 12/2008 Russell .......................... 370/331
2009/0318144 A1* 12/2009 Thomas et al. ............... 455/434
2010/0317357 A1* 12/2010 Miki et al. .................... 455/450

FOREIGN PATENT DOCUMENTS

EP          2217014 A1       8/2010
JP        2004-349976 A     12/2004
WO       2009/057782 A1      5/2009

OTHER PUBLICATIONS

3GPP TS 36.300; 3rd Generation Partnership Project; Technical Specification Group Radio Access Network; Evolved Universal Terrestrial Radio Access (E-UTRA) and Evolved Universal Terrestrial Radio Access Network (E-UTRAN); Overral description; Stage 2 (Release 8).
International Search Report; PCT/JP2010/062643; Nov. 16, 2010.
An Office Action,"Notice of Reason for Rejection," issued by the Japanese Patent Office on Aug. 20, 2013, which corresponds to Japanese Patent Application No. 2011-524799 and is related to U.S. Appl. No. 13/387,564; with statement of relevance.

* cited by examiner

*Primary Examiner* — Allahyar Kasraian
(74) *Attorney, Agent, or Firm* — Studebaker & Brackett PC

(57) ABSTRACT

An LTE base station (100) conducts radio communication with a radio terminal which can execute a handover between a plurality of radio communication systems having different attainable communication rates. The LTE base station (100) is provided with a service detection unit (121A), which detects the classification of a communication service being used by a radio terminal, and a transmission unit (111), which sends the radio terminal a command for handover to the radio base station of a radio communication system, which handles the communication rate required for the communication service detected by the service detection unit (121A).

12 Claims, 7 Drawing Sheets

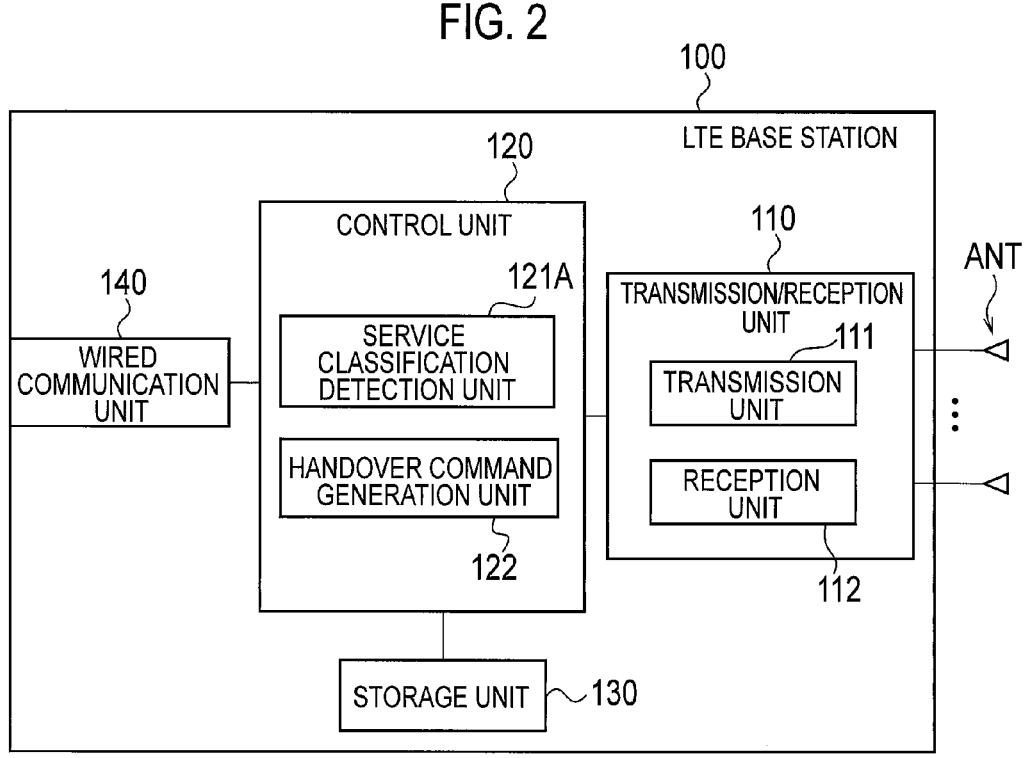

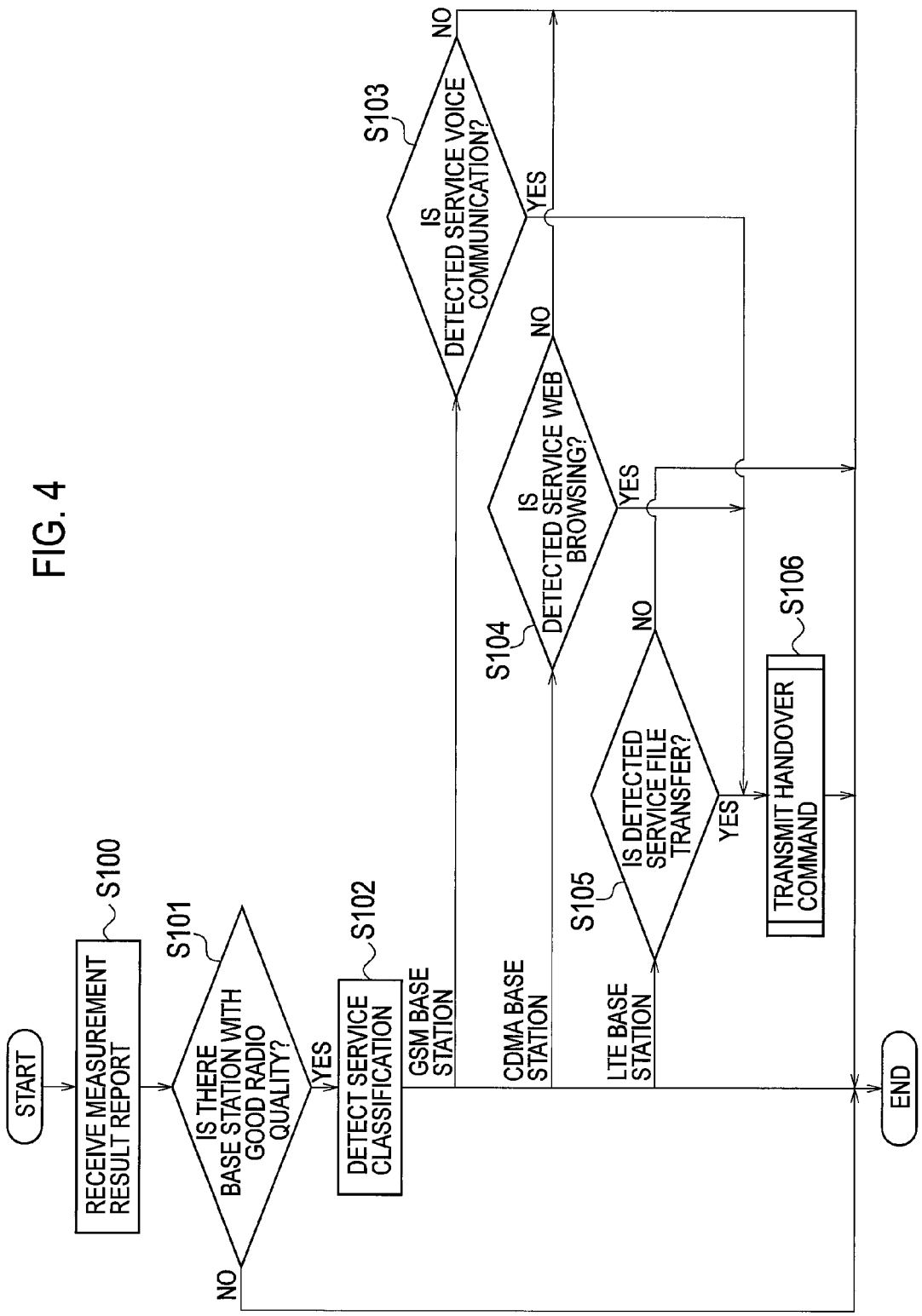

| COMMUNICATION RATE | RADIO COMMUNICATION SYSTEM |
|---|---|
| LOW SPEED (ABOUT 40 KBPS) | GSM |
| MIDDLE SPEED (ABOUT 1 MBPS) | CDMA |
| HIGH SPEED (10 MBPS OR HIGHER) | LTE |

| SERVICE IN USE | OFFSET VALUE |
|---|---|
| VOICE COMMUNICATION SERVICE (INCLUDING ROHC) | GSM+a |
| DATA COMMUNICATION SERVICE (HTTP) | CDMA+b |
| DATA COMMUNICATION SERVICE (FTP) | LTE+c |
| PLURALITY OF DATA COMMUNICATION SERVICES | LTE+d |

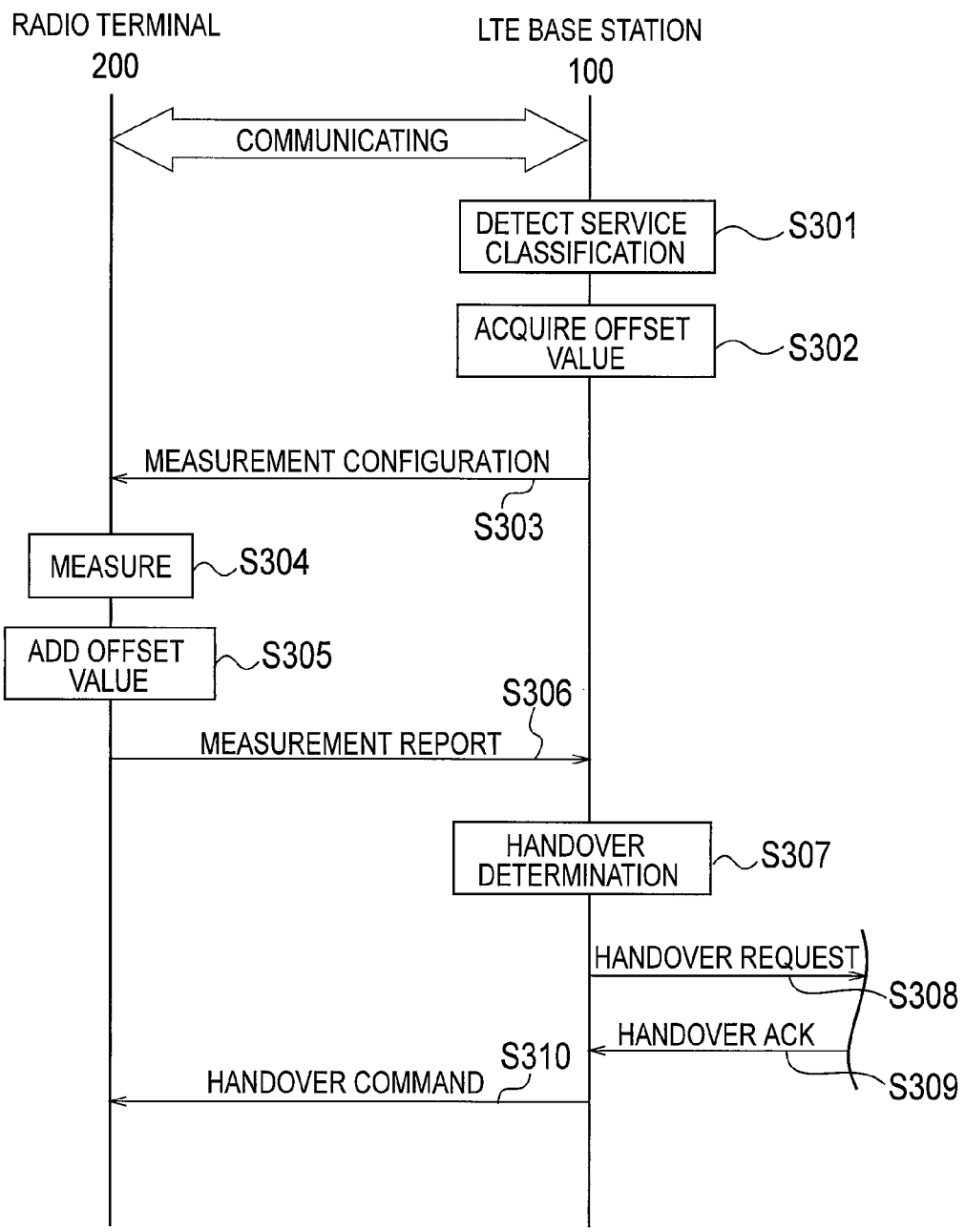

RADIO BASE STATION AND HANDOVER CONTROL METHOD IN A MULTI-SYSTEM ENVIRONMENT

TECHNICAL FIELD

The present invention relates to a radio base station that controls handover performed by a radio terminal, and a handover control method.

BACKGROUND ART

In recent years, with the spread of radio communication and the diversification of a communication service, since traffic transmitted in a radio communication system is rapidly increased, it is necessary to increase a communication rate in the radio communication system. In order to cope with such a request, 3GPP (3rd Generation Partnership Project), which is a standardization project of the radio communication system, has standardized an LTE (Long Term Evolution) system regarded as the next generation (the 3.9th generation). In such a next-generation radio communication system, it is possible to achieve a higher communication rate as compared with an existing radio communication system.

In the LTE system, in order to efficiently use a limited radio resource, a function called RRM (Radio Resource Management) is adopted (see Non-Patent Document 1). In the RRM, when the number of radio terminals connected to a radio base station is large and load of the radio base station is increased, the radio base station transmits a handover command for a handover toward another radio base station to the radio terminal. In this way, load distribution may be achieved between the radio base stations.

Furthermore, the radio base station of the LTE system may transmit a command for a handover toward an existing radio communication system (for example, GSM, W-CDMA, CDMA 2000 and the like) from the LTE system to the radio terminal.

PRIOR ART DOCUMENT

Non-Patent Document

Non-Patent Document 1: 3GPP TS 36.300, V8.9.0 (2009 June), Chapter 16, <URL: http://www.3gpp.org/ftp/Specs/archive/36_series/36.300/36300-890.zip>

SUMMARY OF THE INVENTION

Meanwhile, since a radio base station compatible with the next-generation radio communication system has been gradually installed, a communication coverage of the next-generation radio communication system is limited when a service initially starts.

However, when a radio terminal using a communication service (for example, a voice communication service) requiring a low communication rate is connected to the radio base station of the next-generation radio communication system, a high communication rate of the next-generation radio communication system may not be provided and a radio resource of the next-generation radio communication system may be wasted. Therefore, there is a problem that it is not possible to effectively utilize a radio communication system capable of a high-speed communication, as with the next-generation radio communication system.

Therefore, an object of the present invention is to provide a radio base station which can effectively utilize a radio communication system capable of performing high-speed communication, and a handover control method, when a plurality of radio communication systems exist.

To solve the above problem, the present invention has following features. A first feature of the present invention is summarized as a radio base station (LTE base station 100) that performs radio communication with a radio terminal (radio terminal 200) capable of performing handover among a plurality of radio communication systems in which attainable communication rates are different from each other, comprising: a detection unit (service detection unit 121A) configured to detect classification of a communication service being used by the radio terminal; and a transmission unit (transmission unit 111) configured to transmit a command for a handover toward a radio base station of a radio communication system supporting a communication rate required in the classification of the communication service detected by the detection unit, to the radio terminal.

According to such a feature, when the communication rate required for each type of communication service used by the radio terminal is low, it is possible to make the radio terminal to perform a handover toward a radio communication system with a lower communication rate. Moreover, when the communication rate required for each type of the communication service used by the radio terminal is high, it is possible to make the radio terminal to perform a handover toward a radio communication system capable of a high-speed communication.

Therefore, it is possible to provide that the radio resource of a radio communication system (i.e., a next-generation radio communication system) capable of a high-speed communication is preferentially used for the radio terminal that is using a communication service requiring a high-speed communication rate. This enables effective use of a radio communication system capable of a high-speed communication.

In the first feature, the radio base station further comprising a reception unit (reception unit 112) configured to receive information indicating radio quality between the radio terminal and another radio base station from the radio terminal, and wherein the transmission unit transmits a command for a handover toward said another radio base station to the radio terminal, when the radio quality is good and said another radio base station is the radio base station of the radio communication system supporting the communication rate required in the classification of the communication service detected by the detection unit.

A second feature of the present invention is summarized as a radio base station that performs radio communication with respect to a radio terminal (radio terminal 200) capable of performing handover among a plurality of radio communication systems in which attainable communication rates are different from each other, comprising: a measurement unit (communication rate measurement unit 121B) configured to measure a communication rate of radio communication between the radio terminal and the radio base station; and a transmission unit (transmission unit 111) configured to transmit a command for a handover toward a radio base station of a radio communication system supporting the communication rate measured by the measurement unit, to the radio terminal.

According to such a feature, when the communication rate of the radio communication with the radio terminal is high, it is possible to make the radio terminal to perform a handover toward a radio communication system capable of a high-speed communication. Further, when the communication rate of the radio communication with the radio terminal is low, it is possible to make the radio terminal to perform a handover toward a radio communication system with a low communication rate.

Therefore, it is possible to provide that the radio resource of a radio communication system (e.g., a next-generation radio communication system) capable of a high-speed communication is preferentially used for the radio terminal that needs to perform a high-speed radio communication (i.e., a radio terminal that is using a communication service requiring a high-speed communication rate). This enables effective use of a radio communication system capable of a high-speed communication.

In the second feature, the radio base station further comprising: a reception unit (reception unit 112) configured to receive information indicating radio quality between the radio terminal and another radio base station from the radio terminal, and wherein the transmission unit transmits a command for a handover toward said another radio base station to the radio terminal, when the radio quality is good and said another radio base station is the radio base station of the radio communication system supporting the communication rate measured by the measurement unit.

A third feature of the present invention is summarized as a handover control method, comprising: a step of detecting by a radio base station, which performs radio communication with respect to a radio terminal capable of performing handover among a plurality of radio communication systems in which attainable communication rates are different from each other, classification of a communication service being used by the radio terminal; and a step of transmitting a command for a handover toward a radio base station of a radio communication system supporting a communication rate required in the classification of the communication service, which is detected in the detection step, from the radio base station to the radio terminal.

A fourth feature of the present invention is summarized as a handover control method, comprising: a step of measuring by a radio base station, which performs radio communication with respect to a radio terminal capable of performing handover among a plurality of radio communication systems in which attainable communication rates are different from each other, a communication rate of radio communication between the radio terminal and the radio base station; and a step of transmitting a command for a handover toward a radio base station of a radio communication system supporting the communication rate measured in the measurement step, from the radio base station to the radio terminal.

According to the characteristics of the present invention, it is possible to provide a radio base station which can effectively utilize a radio communication system capable of performing high-speed communication, and a handover control method, when a plurality of radio communication systems exist.

BRIEF DESCRIPTION OF THE DRAWINGS

FIG. 2 is a block diagram illustrating the configuration of an LTE base station according to the first embodiment of the present invention.

FIG. 3 is a diagram illustrating a configuration example of a table held by a storage unit of the LTE base station according to the first embodiment of the present invention.

FIG. 4 is a flowchart illustrating the operation of the LTE base station according to the first embodiment of the present invention.

FIG. 10 is a sequence diagram illustrating an operation sequence of the LTE base station and a radio terminal according to the third embodiment of the present invention.

MODES FOR CARRYING OUT THE INVENTION

Figure 1:
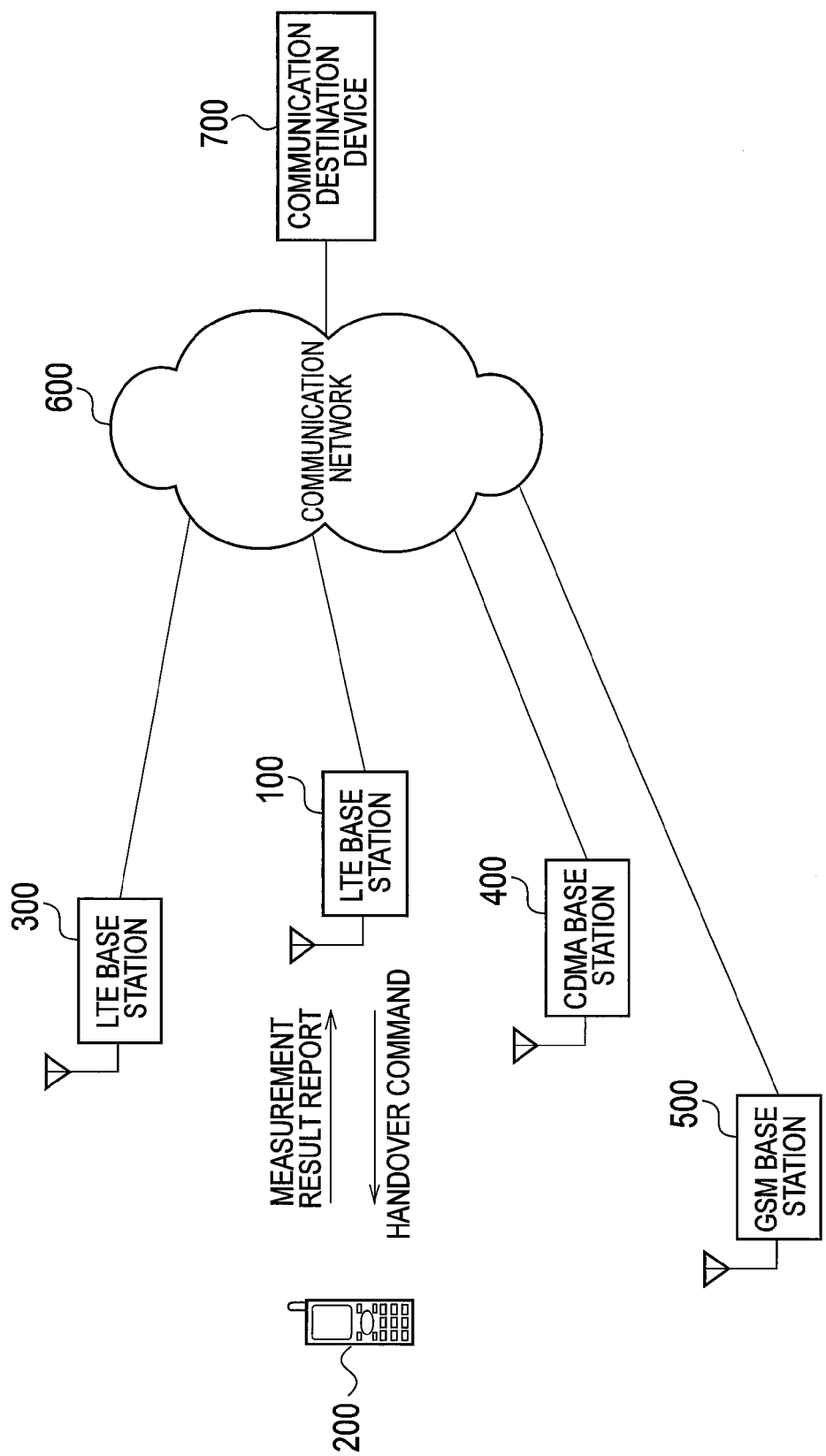
FIG. 1 is a diagram illustrating the schematic configuration of a communication system according to a first embodiment and a second embodiment of the present invention.

Next, with reference to the accompanying drawings, a first embodiment, a second embodiment, a third embodiment, and other embodiments of the present invention will be described. It is to be noted that the same or similar reference numerals are applied to the same or similar parts through the drawings in the following embodiments.

(1) First Embodiment

In the first embodiment, (1.1) Configuration Example of Communication System, (1.2) Configuration of LTE Base Station, (1.3) Operation of LTE Base Station, and (1.4) Operation and Effect will be described.

(1.1) Configuration Example of Communication System

The communication system illustrated in FIG. 1 includes an LTE base station 100, a radio terminal 200, an LTE base station 300, a CDMA base station 400, a GSM base station 500, a communication network 600, and a communication destination device 700. The radio terminal 200 has established a radio connection to the LTE base station 100, and communicates with the communication destination device 700 such as a server or a communication terminal via the LTE base station 100 and the communication network 600. In the example of FIG. 1, only one radio terminal 200 is connected to the LTE base station 100. However, actually, a plurality of radio terminals 200 are connected to the LTE base station 100.

The LTE base station 100 and the LTE base station 300 are configured according to LTE (E-UTRAN) regarded as the 3.9th-generation portable telephone system. In the LTE system, OFDM (Orthogonal Frequency Division Multiplexing) is employed for a downlink and SC-FDMA (Single-Carrier Frequency-Division Multiple Access) is employed for an uplink. In the LTE system, a high communication rate of about 100 Mbps (a theoretical download speed) at maximum is provided.

In addition, in the LTE system, handover led by a base station is employed. That is, the LTE base station 100 specifies a radio base station (a handover destination) and allows the radio terminal 200 to be handed over to the radio base station.

The CDMA base station 400 is configured according to a CDMA system such as W-CDMA (Wideband Code Division Multiple Access) or CDMA-2000, which is regarded as the 3rd-generation portable telephone system. A communication rate attainable by the CDMA system is lower than a communication rate attainable by the LTE system.

The GSM base station 500 is configured according to GSM (Global System for Mobile Communications) which is regarded as the 2nd-generation portable telephone system. A communication rate attainable by the GSM system is lower than the communication rate attainable by the CDMA system. In detail, in the GSM system, a communication rate of about 171 kbps (a theoretical downstream value) at maximum is provided.

The radio terminal 200 is a multi-mode terminal supporting the radio communication system such as the LTE system, the CDMA system, and the GSM system.

The radio terminal 200 uses a communication service such as a voice communication service, a WEB browsing service, or a file transfer service. The "communication service" is an application software corresponding to the uppermost layer in a communication protocol stack.

The voice communication service is a communication service not requiring a high communication rate. The WEB browsing service is a communication service requiring a communication rate higher than that of the voice communication service. The file transfer service is a communication service requiring a communication rate higher than that of the WEB browsing service.

The radio terminal 200 being connected to the LTE base station 100 measures the reception quality (hereinafter, referred to as radio quality) of radio signals, which are transmitted by the LTE base station 100, the LTE base station 300, the CDMA base station 400, and the GSM base station 500, in a periodic manner or according to an instruction of the LTE base station 100. Here, the radio quality indicates a received signal strength indicator (RSSI), a signal to interference noise ratio (SINR) and the like.

The radio terminal 200 transmits a measurement result report including information on the measured radio quality to the LTE base station 100. The measurement result report is referred to as a "Measurement Report" in the LTE system.

The LTE base station 100 transmits a handover command, which gives an instruction to switch a connection destination from the LTE base station 100 to another radio base station, to the radio terminal 200 based on the measurement result report received from the radio terminal 200. For example, when the radio quality between the radio terminal 200 and the another radio base station is higher than the radio quality between the radio terminal 200 and the LTE base station 100, the LTE base station 100 may transmit a handover command to the another radio base station to the radio terminal 200.

In the first embodiment, the LTE base station 100 decides a radio base station (a handover destination) according to a communication service being used by the radio terminal 200, as well as the radio quality.

(1.2) Configuration of LTE Base Station

FIG. 2 is a block diagram illustrating the configuration of the LTE base station 100 according to the first embodiment.

As illustrated in FIG. 2, the LTE base station 100 includes an antenna unit ANT, a transmission/reception unit 110, a control unit 120, a storage unit 130, and a wired communication unit 140.

The transmission/reception unit 110 is configured by an RF circuit, a BB circuit and the like, and transmits/receives a radio signal via the antenna unit ANT. The transmission/reception unit 110 includes a transmission unit 111 configured to transmit the radio signal, and a reception unit 112 configured to receive the radio signal.

The transmission unit 111 encodes and modulates a transmission signal from the control unit 120, up-converts and amplifies the modulated transmission signal, and transmits the up-converted and amplified signal from the antenna unit ANT.

The reception unit 112 amplifies and down-converts a reception signal from the antenna unit ANT, demodulate and decode the down-converted reception signal, and input the demodulated and decoded signal to the control unit 120. The reception unit 112 receives the measurement result report transmitted by the radio terminal 200.

The control unit 120 is configured by, for example, a CPU, and controls various functions of the LTE base station 100 and performs various types of computation processing of the LTE base station 100. The storage unit 130 is configured by, for example, a memory, and stores various pieces of information used for the control, computation process and the like of the LTE base station 100. The wired communication unit 140 communicates with another apparatus via the communication network 600.

The control unit 120 includes a service detection unit 121A and a handover command generation unit 122.

The service detection unit 121A detects the classification of a communication service being used by the radio terminal 200. A method for detecting the classification of the communication service includes a method for capturing packets exchanged by the radio terminal 200 and analyzing each packet (in detail, a header part of a packet). However, other methods may also be used. As other methods, there exist a determination method based on the size of a packet and a determination method based on session classification.

When the measurement result report received in the reception unit 112 represents that there exists another radio base station with good radio quality with the radio terminal 200 and the another radio base station is a radio base station of a radio communication system supporting a communication rate required in the classification of the communication service detected by the service detection unit 121A, the handover command generation unit 122 generates a handover command for a handover toward the another radio base station. The transmission unit 111 transmits the generated handover command to the radio terminal 200.

The storage unit 130 holds a table indicating a correspondence relation between the classification of the communication service and the radio communication system, and the handover command generation unit 122 decides a radio communication system (a handover destination) from the classification of the communication service detected by the service detection unit 121A, with reference to the table.

FIG. 3 is a diagram illustrating a configuration example of the table held by the storage unit 130.

The voice communication service is associated with the GSM system. When the voice communication service, specifically, ROHC (Robust Header Compression) is used, the size of one packet is about 30 bytes (when a voice codec is G.729). Thus, since a required communication rate is a low speed (for example, about 40 kbps), it is possible to sufficiently maintain service quality even in the GSM system.

The WEB browsing service using a protocol such as HTTP (Hyper Text Transfer Protocol) is associated with the CDMA system. In the WEB browsing service, since it is possible to use a comfortable service if a medium communication rate of about 1 Mbps is generally maintained, the CDMA system with a communication rate lower than that of the LTE system is connected to the WEB browsing service.

The file transfer service using a protocol such as FTP (File Transfer Protocol) is associated with the LTE system. The file transfer service is so provided to be preferentially connected to a wideband system such as the LTE system because the service quality is improved as a communication rate is increased. Furthermore, it may also be assumed that one user (terminal) simultaneously uses a plurality of services. In such a case, since large capacity radio communication is required, the wideband system such as the LTE system is preferentially connected to the large capacity radio communication.

(1.3) Operation of LTE Base Station

FIG. 4 is a flowchart illustrating the operation of the LTE base station 100 according to the first embodiment. The operation flow illustrated in FIG. 4 is performed for each of the plurality of radio terminals 200 connected to the LTE base station 100.

In step S100, the reception unit 112 receives a measurement result report from the radio terminals 200.

When the measurement result report received in the reception unit 112 includes information on a radio base station with good radio quality between the radio terminals 200 and the radio base station (step S101; YES), the service detection unit 121A detects the classification of a communication service being used by the radio terminals 200 in step S102.

Firstly, the case in which the radio base station with the good radio quality is the GSM base station 500 will be described. When the radio base station with the good radio quality is the GSM base station 500 and the classification of the communication service detected by the service detection unit 121A is a voice communication service (step S103; YES), the handover command generation unit 122 generates a handover command for a handover toward the GSM base station 500 in step S106. The transmission unit 111 transmits the handover command generated by the handover command generation unit 122 to the radio terminal 200.

Meanwhile, when the radio base station with the good radio quality is the GSM base station 500 and the classification of the communication service detected by the service detection unit 121A is not the voice communication service (step S103; NO), the handover command generation unit 122 omits the generation of the handover command and the transmission unit 111 omits the transmission of the handover command.

Secondly, the case in which the radio base station with the good radio quality is the CDMA base station 400 will be described. When the radio base station with the good radio quality is the CDMA base station 400 and the classification of the communication service detected by the service detection unit 121A is a WEB browsing service (step S104; YES), the handover command generation unit 122 generates a handover command for a handover toward the CDMA base station 400 in step S106. The transmission unit 111 transmits the handover command generated by the handover command generation unit 122 to the radio terminal 200.

Meanwhile, when the radio base station with the good radio quality is the CDMA base station 400 and the classification of the communication service detected by the service detection unit 121A is not the WEB browsing service (step S104; NO), the handover command generation unit 122 omits the generation of the handover command and the transmission unit 111 omits the transmission of the handover command.

Thirdly, the case in which the radio base station with the good radio quality is the LTE base station 300 will be described. When the radio base station with the good radio quality is the LTE base station 300 and the classification of the communication service detected by the service detection unit 121A is a file transfer service (step S105; YES), the handover command generation unit 122 generates a handover command for a handover toward the LTE base station 300 in step S106. The transmission unit 111 transmits the handover command generated by the handover command generation unit 122 to the radio terminal 200.

Meanwhile, when the radio base station with the good radio quality is the LTE base station 300 and the classification of the communication service detected by the service detection unit 121A is not the file transfer service (step S105; NO), the handover command generation unit 122 omits the generation of the handover command and the transmission unit 111 omits the transmission of the handover command.

(1.4) Operation and Effect

When a communication rate required in the classification of the communication service being used by the radio terminal 200 is low, the LTE base station 100 allows the radio terminal 200 to be handed over to the CDMA system or the GSM system. When the communication rate required in the classification of the communication service being used by the radio terminal 200 is high, the LTE base station 100 may allow the radio terminal 200 to be handed over to the LTE system.

In this way, it is possible to reduce the load of the LTE base station 100 when the radio terminal 200 having used a low speed communication service is connected to the LTE base station 100. The load of the LTE base station 100 is reduced, resulting in the improvement of service quality when the radio terminal 200 having used a high-speed communication service is connected to the LTE base station 100.

As described above, it is possible to allow a radio resource of the LTE system to be preferentially used by the radio terminal 200 having used the high-speed communication service, so that the radio resource of the LTE system can be effectively utilized. Moreover, handover from the LTE system to an existing radio communication system (the CDMA system or the GSM system) is actively performed, so that load distribution can be more flexibly achieved.

In the first embodiment, when radio quality between a radio base station (another radio base station) other than the LTE base station 100 and the radio terminal 200 is good, the LTE base station 100 sets the another radio base station as a handover destination candidate of the radio terminal 200. Since the number of radio base stations of an existing radio communication system is large, it is easy to search for a handover destination candidates with good radio quality.

Furthermore, when the another radio base station is a radio base station of a radio communication system supporting the classification of a communication service detected by the service detection unit 121A, the LTE base station 100 transmits a command for a handover toward the another radio base station to the radio terminal 200. In this way, it is possible to allow the radio terminal 200 to be handed over to a radio base station with good radio quality between the radio base station and the radio terminal 200, and it is possible for the radio terminal 200 to stably perform communication even after the radio terminal 200 is handed over to the radio base station.

(2) Second Embodiment

In the first embodiment, a radio base station (a handover destination) is decided according to both the classification of a communication service being used by the radio terminal 200 and radio quality. In a second embodiment, instead of the classification of the communication service, a communication rate of radio communication with the radio terminal 200 is used.

In the second embodiment, (2.1) Configuration of LTE Base Station, (2.2) Operation of LTE Base Station, and (2.3) Operation and Effect will be described, and the description overlapping the first embodiment will be omitted.

(2.1) Configuration of LTE Base Station

Figures 5, 6:
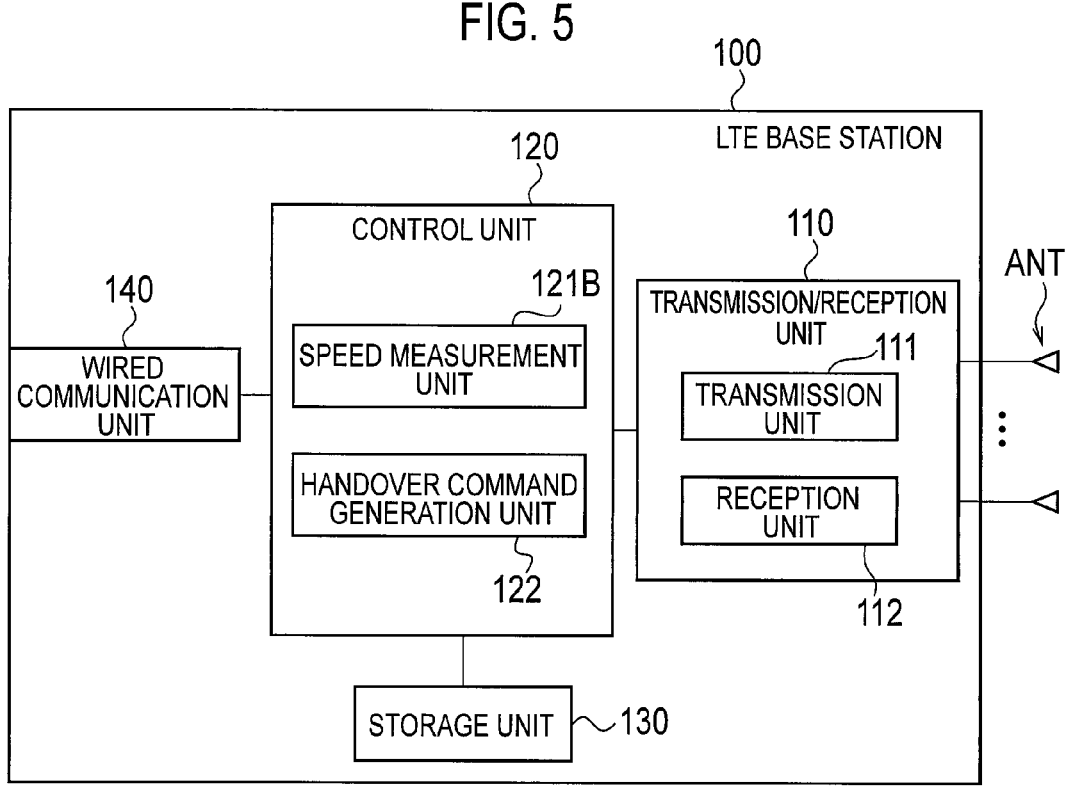
FIG. 5 is a block diagram illustrating the configuration of an LTE base station according to the second embodiment of the present invention.
FIG. 6 is a diagram illustrating a configuration example of a table held by a storage unit of the LTE base station according to the second embodiment of the present invention.

FIG. 5 is a block diagram illustrating the configuration of the LTE base station 100 according to the second embodiment.

As illustrated in FIG. 5, the LTE base station 100 includes a communication rate measurement unit 121B, instead of the service detection unit 121A described in the first embodiment. The communication rate measurement unit 121B measures a communication rate of radio communication with the radio terminal 200. The communication rate of the radio communication with the radio terminal 200 is defined according to the classification of a communication service used by the radio terminal 200. In order to exclude the influence by a temporary reduction of a communication rate, it is preferable that the communication rate measurement unit 121B measures an average value (a moving average value) of a communication rate for a predetermined period, other than an instantaneous value of a communication rate.

The handover command generation unit 122 generates a command for a handover toward a radio base station of a radio communication system supporting the communication rate measured by the communication rate measurement unit 121B. The transmission unit 111 transmits the generated handover command to the radio terminal 200.

FIG. 6 is a diagram illustrating a configuration example of the table held by the storage unit 130. The GSM system is associated with a communication rate "low speed". The CDMA system is associated with a communication rate "medium speed". The LTE system is associated with a communication rate "high speed".

(2.2) Operation of LTE Base Station

Figure 7:
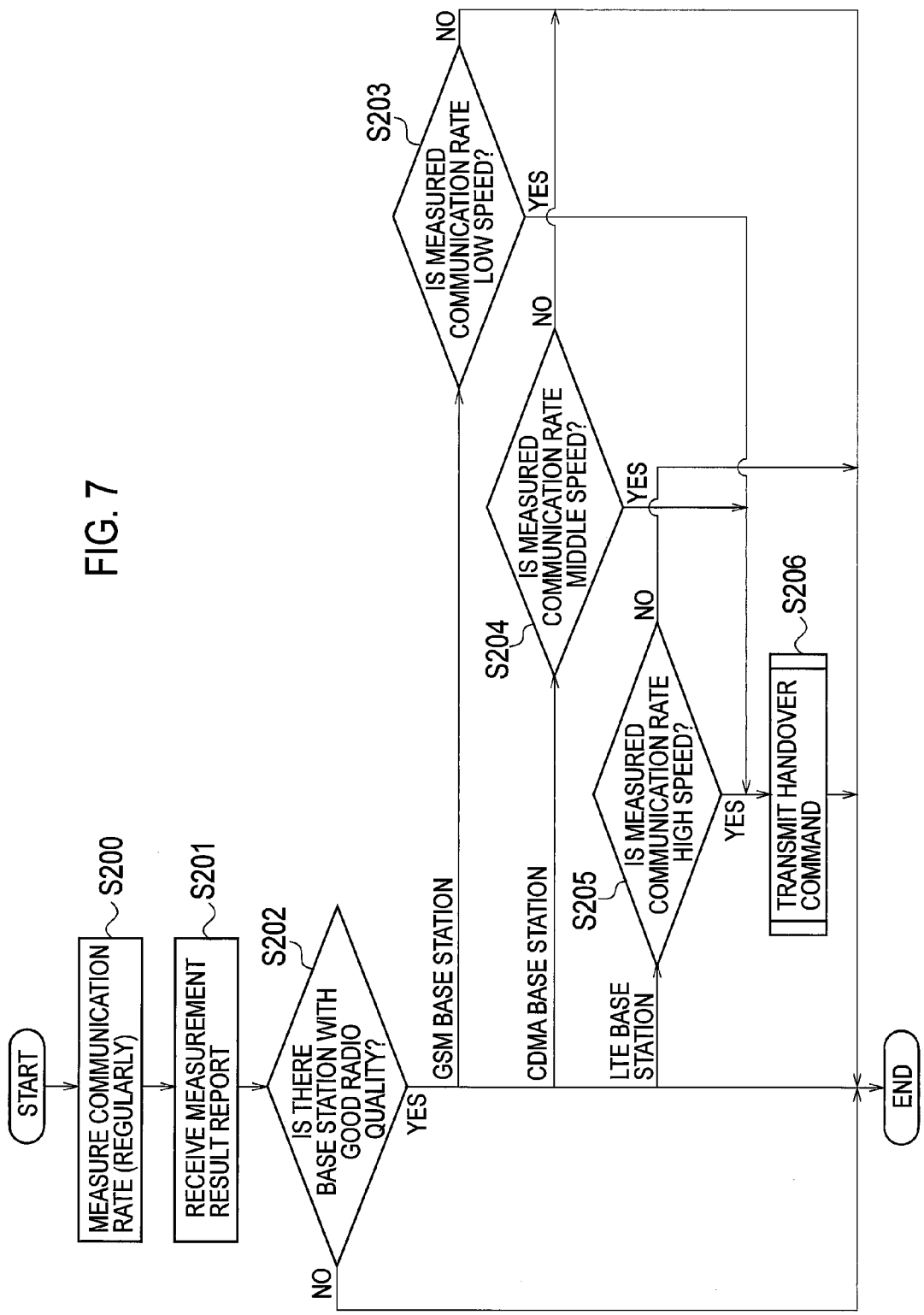
FIG. 7 is a flowchart illustrating the operation of the LTE base station according to the second embodiment of the present invention.

FIG. 7 is a flowchart illustrating the operation of the LTE base station 100 according to the second embodiment. The operation flow illustrated in FIG. 7 is performed for each of the plurality of radio terminals 200 connected to the LTE base station 100.

In step S200, the communication rate measurement unit 121B measures a communication rate of radio communication with the radio terminals 200.

In step S201, the reception unit 112 receives a measurement result report from the radio terminals 200.

Firstly, the case in which the radio base station with the good radio quality is the GSM base station 500 will be described. When the radio base station with the good radio quality is the GSM base station 500 and the communication rate measured by the communication rate measurement unit 121B is a low speed (step S203; YES), the handover command generation unit 122 generates a handover command for a handover toward the GSM base station 500 in step S206. The transmission unit 111 transmits the handover command generated by the handover command generation unit 122 to the radio terminal 200.

Meanwhile, when the radio base station with the good radio quality is the GSM base station 500 and the communication rate measured by the communication rate measurement unit 121B is not the low speed (step S203; NO), the handover command generation unit 122 omits the generation of the handover command and the transmission unit 111 omits the transmission of the handover command.

Secondly, the case in which the radio base station with the good radio quality is the CDMA base station 400 will be described. When the radio base station with the good radio quality is the CDMA base station 400 and the communication rate measured by the communication rate measurement unit 121B is a medium speed (step S204; YES), the handover command generation unit 122 generates a handover command for a handover toward the CDMA base station 400 in step S206. The transmission unit 111 transmits the handover command generated by the handover command generation unit 122 to the radio terminal 200.

Meanwhile, when the radio base station with the good radio quality is the CDMA base station 400 and the communication rate measured by the communication rate measurement unit 121B is not the medium speed (step S204; NO), the handover command generation unit 122 omits the generation of the handover command and the transmission unit 111 omits the transmission of the handover command.

Thirdly, the case in which the radio base station with the good radio quality is the LTE base station 300 will be described. When the radio base station with the good radio quality is the LTE base station 300 and the communication rate measured by the communication rate measurement unit 121B is a high speed (step S204; YES), the handover command generation unit 122 generates a handover command for a handover toward the LTE base station 300 in step S206. The transmission unit 111 transmits the handover command generated by the handover command generation unit 122 to the radio terminal 200.

Meanwhile, when the radio base station with the good radio quality is the LTE base station 300 and the communication rate measured by the communication rate measurement unit 121B is not the high speed (step S204; NO), the handover command generation unit 122 omits the generation of the handover command and the transmission unit 111 omits the transmission of the handover command.

(2.3) Operation and Effect

When the communication rate of the radio communication with the radio terminals 200 is low, the LTE base station 100 allows the radio terminal 200 to be handed over to the CDMA system or the GSM system. When the communication rate of the radio communication with the radio terminals 200 is high, the LTE base station 100 may allow the radio terminal 200 to be handed over to the LTE system.

In this way, it is possible to reduce the load of the LTE base station 100 when the radio terminal 200 (that is, the radio terminal 200 using a low speed communication service) performing low speed radio communication is connected to the LTE base station 100. The load of the LTE base station 100 is reduced, resulting in the improvement of service quality when the radio terminal 200 (that is, the radio terminal 200 using a high-speed communication service) performing high speed radio communication is connected to the LTE base station 100.

Consequently, according to the second embodiment, it is possible to achieve the same effect as the first embodiment.

(3) Third Embodiment

In the third embodiment, the LTE base station 100 performs control such that an offset value is added to radio quality measured in the radio terminal 200 according to the classification of a communication service being used by the radio terminal 200.

In the third embodiment, (3.1) Configuration of LTE Base Station, (3.2) Operations of LTE Base Station and Radio Terminal, and (3.3) Operation and Effect will be described, and the description overlapping the first embodiment will be omitted.

(3.1) Configuration of LTE Base Station

Figures 8, 9:
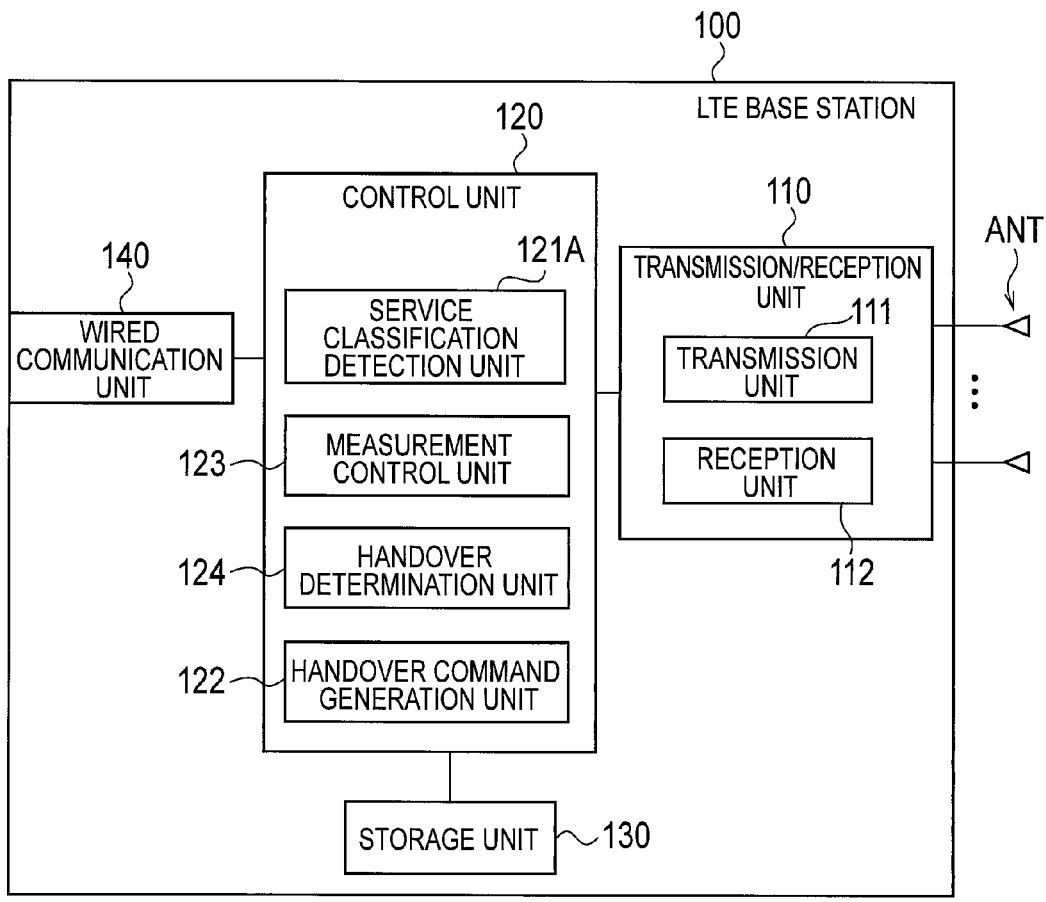
FIG. 8 is a block diagram illustrating the configuration of an LTE base station according to a third embodiment of the present invention.
FIG. 9 is a diagram illustrating a configuration example of a table held by a storage unit of the LTE base station according to the third embodiment of the present invention.

FIG. 8 is a block diagram illustrating the configuration of the LTE base station 100 according to the third embodiment.

As illustrated in FIG. 8, the third embodiment is different from the first embodiment in that the LTE base station 100 further includes a measurement control unit 123 and a handover determination unit 124.

The measurement control unit 123 controls the measurement of radio quality in the radio terminal 200. In detail, the measurement control unit 123 acquires an offset value associated with a radio communication system from the storage unit 130 according to the classification of the communication service being used by the radio terminal 200, which has been detected by the service detection unit 121A. Furthermore, the measurement control unit 123 controls the transmission unit 111 such that the transmission unit 111 transmits measurement control information (Measurement Configuration) including information indicating the acquired offset value to the radio terminal 200.

FIG. 9 is a diagram illustrating a configuration example of the table held by the storage unit 130.

As illustrated in FIG. 9, an offset value a related to radio quality in the GSM system is associated with the voice communication service. An offset value b related to radio quality in the CDMA system is associated with the WEB browsing service using a protocol such as HTTP. An offset value c related to radio quality in the LTE system is associated with the file transfer service using a protocol such as FTP. Furthermore, an offset value d related to radio quality in the LTE system is associated with the case in which a plurality of services are simultaneously used. In addition, the offset values a to d may be equal to each other or may be different from each other.

The handover determination unit 124 determines whether to perform a handover based on the measurement result report received in the reception unit 112. For example, the handover determination unit 124 compares radio quality between the radio terminal 200 and the LTE base station 100 with radio quality between the radio terminal 200 and another radio base station. When the radio quality between the radio terminal 200 and the another radio base station is higher than the radio quality between the radio terminal 200 and the LTE base station 100, the handover determination unit 124 determines that the LTE base station 100 allows the radio terminal 200 to be handed over to the another radio base station. Here, an offset value supporting the classification of the communication service is added to the radio quality included in the measurement result report.

The handover command generation unit 122 checks the acceptance or refusal of the radio terminal 200 with respect to another radio base station selected as a handover destination by the handover determination unit 124, and then generates a handover command for a handover toward the another radio base station. The transmission unit 111 transmits the generated handover command to the radio terminal 200.

(3.2) Operations of LTE Base Station and Radio Terminal

FIG. 10 is a sequence diagram illustrating an operation sequence of the LTE base station 100 and the radio terminal 200 according to the third embodiment. The operation sequence illustrated in FIG. 10 is performed for each of the plurality of radio terminals 200 connected to the LTE base station 100.

In step S301, the service detection unit 121A detects the classification of a communication service being used by the radio terminal 200 by using the method described in the first embodiment.

In step S302, the measurement control unit 123 acquires an offset value from the storage unit 130 according to the classification of the communication service being used by the radio terminal 200, which has been detected by the service detection unit 121A. For example, when the classification of the communication service being used by the radio terminal 200 is the voice communication service, the measurement control unit 123 acquires the offset value a related to the radio quality in the GSM system. When the classification of the communication service being used by the radio terminal 200 is the WEB browsing service, the measurement control unit 123 acquires the offset value b related to the radio quality in the CDMA system. When the classification of the communication service being used by the radio terminal 200 is the file transfer service, the measurement control unit 123 acquires the offset value c related to the radio quality in the LTE system. When a plurality of communication services are being used by the radio terminal 200, the measurement control unit 123 acquires the offset value d related to the radio quality in the LTE system. Then, the measurement control unit 123 generates the measurement control information (Measurement Configuration) including information indicating the acquired offset values, and outputs the measurement control information to the transmission unit 111.

In step S303, the transmission unit 111 transmits the measurement control information (Measurement Configuration) to the radio terminal 200. The radio terminal 200 receives and stores the measurement control information (Measurement Configuration).

In step S304, the radio terminal 200 measures radio quality in a plurality of radio communication systems including the LTE system. For example, the radio terminal 200 measures RSSIs or SINRs, which are transmitted by the LTE base station 100, the LTE base station 300, the CDMA base station 400, and the GSM base station 500, as radio quality. Specifically, the RSSI is reference signal received power (RSRP) and the SINR is reference signal reception quality (RSRQ).

In step S305, the radio terminal 200 adds an offset value, which is included in the measurement control information (Measurement Configuration), to the measured radio quality.

In step S306, the radio terminal 200 transmits a measurement result report (Measurement Report), which includes information indicating the radio quality in the plurality of radio communication systems, to the LTE base station 100. Here, the radio quality has an offset value added thereto. The LTE base station 100 receives the measurement result report (Measurement Report).

In step S307, the LTE base station 100 compares radio quality between the radio terminal 200 and the LTE base station 100 with radio quality between the radio terminal 200 and another radio base station. When the radio quality between the radio terminal 200 and the another radio base station is higher than the radio quality between the radio terminal 200 and the LTE base station 100, the handover determination unit 124 determines that the LTE base station 100 allows the radio terminal 200 to be handed over to the another radio base station.

The LTE base station 100 checks the acceptance or refusal of the radio terminal 200 with respect to the another radio base station selected as a handover destination by the handover determination unit 124 (steps S308 and S309), and then generates a handover command (Handover Command) for a handover toward the another radio base station in step S310. The transmission unit 111 transmits the generated handover command (Handover Command) to the radio terminal 200.

(3.3) Operation and Effect

The LTE base station 100 controls the measurement in the radio terminal 200, thereby allowing the radio terminal 200 to be preferentially handed over to the CDMA system or the GSM system when the communication rate required in the classification of the communication service being used by the radio terminal 200 is low. The LTE base station 100 controls the measurement in the radio terminal 200, thereby allowing the radio terminal 200 to be preferentially handed over to the LTE system when the communication rate required in the classification of the communication service being used by the radio terminal 200 is high.

In this way, it is possible to reduce the load of the LTE base station 100 when the radio terminal 200 having used a low speed communication service is connected to the LTE base station 100. The load of the LTE base station 100 is reduced, resulting in the improvement of service quality when the radio terminal 200 having used a high-speed communication service is connected to the LTE base station 100.

As described above, it is possible to allow a radio resource of the LTE system to be preferentially used by the radio terminal 200 having used the high-speed communication service, so that the radio resource of the LTE system can be effectively utilized. Moreover, handover from the LTE system to an existing radio communication system (the CDMA system or the GSM system) is actively performed, so that load distribution can be more flexibly achieved.

(4) Other Embodiments

While the present invention has been described by way of the foregoing embodiments and examples, as described above, it should not be understood that those descriptions and drawings constituting a part of the present disclosure limit the present invention. Further, various substitutions, examples or operational techniques shall be apparent to a person skilled in the art based on this disclosure.

(4.1) First Modification

In the above-mentioned first embodiment and the second embodiment, the voice communication service, the WEB browsing service, and the file transfer service have been described as the classification of a communication service. However, the present invention is not limited to these communication services.

For example, a communication service requiring a high communication rate includes a moving image streaming service, a bi-directional game application and the like, in addition to the file transfer service. A communication service requiring a low communication rate includes a mail service and the like, in addition to the voice communication service.

(4.2) Second Modification

In the above-mentioned first embodiment and the second embodiment, the GSM system and the CDMA system have been described as a handover destination from the LTE system. However, the present invention is not limited to the GSM system and the CDMA system. That is, the handover destination may also include other radio communication systems (for example, WiMAX (a registered trademark), iBurst (a registered trademark) and the like).

Moreover, a radio base station transmitting the handover command is the LTE base station 100. However, the present invention is not limited to the LTE base station 100 as long as it is a radio base station of a radio communication system employing handover led by a base station.

(4.3) Third Modification

In the above-mentioned first embodiment and the second embodiment, RRM set forth by the LTE specifications has not been specifically mentioned. However, it may be possible to use the handover control method according to the first embodiment and the second embodiment, together with the RRM set forth by the LTE specifications. The RRM includes RBC (Radio Bearer Control), RAC (Radio Admission Control), CMC (Connection Mobility Control), DRA (Dynamic Resource Allocation), ICIC (Inter-cell Interference Coordination), Load Balance (LB), Inter-RAT Radio Resource Management, Subscriber Profile ID for RAT/Frequency Priority, and the like.

(4.4) Fourth Modification

In the above-mentioned first embodiment, the LTE base station 100 decides a radio base station (a handover destination) according to the classification of the communication service being used by the radio terminal 200 and the radio quality. In the above-mentioned second embodiment, the LTE base station 100 decides a radio base station (a handover destination) according to the communication rate of radio communication with the radio terminal 200 and the radio quality. However, when the LTE base station 100 has already comprehended a peripheral radio base station, it may be possible to decide a radio base station (a handover destination) without considering radio quality.

(4.5) Fifth Modification

In the above-mentioned third embodiment, the case in which the offset value is added according to the classification of the communication service is described. However, such a method may be applied to the second embodiment and the offset value may be added according to the communication rate of the radio communication.

(4.6) Sixth Modification

In the above-mentioned third embodiment, the LTE base station 100 asks another radio base station about the acceptance or refusal of the radio terminal 200 before transmitting the handover command to the radio terminal 200. However, such a method may also be applied to the first embodiment and the second embodiment.

Thus, it must be understood that the present invention includes various embodiments that are not described herein. Therefore, the present invention is limited only by the specific features of the invention in the scope of the claims reasonably evident from the disclosure above.

The entire contents of Japanese Patent Application No. 2009-174697 (filed on Jul. 27, 2009) are incorporated in the present specification by reference.

Industrial Applicability

As described above, in accordance with the radio base station and the handover control method according to the present invention, when a plurality of radio communication systems exist, since it is possible to effectively utilize a radio communication system capable of performing high-speed communication, it is available for radio communication such as mobile communication.

The invention claimed is:

1. A radio base station that performs radio communication with a radio terminal capable of performing handover among a plurality of radio communication systems in which attainable communication rates are different from each other, comprising:
　　a control unit configured to determine offset information corresponding to a communication service being used by the radio terminal, transmit the offset information to the radio terminal, and decide a radio communication system of handover destination among the plurality of radio communication systems based on a communication service being used by the radio terminal, a table indicating a correspondence relation between a classification of the communication service and the plurality of radio communication systems, and a measurement report received from the radio terminal, said measurement report adjusted by the radio terminal based on the transmitted offset information; and
　　a transmission unit that transmits a command for a handover toward a radio base station of the radio communication system decided by the control unit, to the radio terminal, wherein in the table, each of the plurality of radio communication systems corresponds to the classification of the communication service according to an attainable communication rate of each of the plurality of radio communication systems.

2. The radio base station according to claim 1, further comprising:
a reception unit configured to receive information indicating radio quality between the radio terminal and another radio base station from the radio terminal, and wherein the transmission unit transmits a command for a handover toward said another radio base station to the radio terminal, when the radio quality is good and said another radio base station is the radio base station of the decided radio communication system supporting the communication rate required in the classification of the communication service.

3. The radio base station according to claim 1, further comprising:
a reception unit configured to receive information indicating radio quality between the radio terminal and another radio base station from the radio terminal, wherein
if the other radio base station is not a base station of the radio communication system decided by the control unit, the transmission unit omits the command for the handover regardless of the radio quality between the radio terminal and the other radio base station.

4. The radio base station according to claim 1, wherein handover of the radio terminal is performed in preference to a base station of a system having a lowest communication rate than can still support the communication service among plural available base station candidates of different systems having different capabilities and that can support the communication service being used.

5. The radio base station according to claim 1, wherein the radio base station is part of an LTE system.

6. A radio base station that performs radio communication with respect to a radio terminal capable of performing handover among a plurality of radio communication systems in which attainable communication rates are different from each other, comprising:
a control unit configured to determine offset information corresponding to a communication rate being used by the radio terminal, transmit the offset information to the radio terminal, and decide a radio communication system of handover destination among the plurality of radio communication systems based on a communication rate of radio communication between the radio terminal and the radio base station, a table with respect to an attainable communication rate of each of the plurality of radio communication systems, and a measurement report received from the radio terminal, said measurement report adjusted by the radio terminal based on the transmitted offset information; and
a transmission unit configured to transmit a command for a handover toward a radio base station of a radio communication system supporting the communication rate measured by the measurement unit, to the radio terminal, wherein
the control unit decides the radio communication system of handover destination as a radio communication system having an attainable communication rate corresponding to the communication rate of the radio communication based on the table.

7. The radio base station according to claim 6, further comprising:

a reception unit configured to receive information indicating radio quality between the radio terminal and another radio base station from the radio terminal, and wherein the transmission unit transmits a command for a handover toward said another radio base station to the radio terminal, when the radio quality is good and said another radio base station is the radio base station of the decided radio communication system supporting the communication rate of radio communication between the radio terminal and the radio base station.

8. The radio base station according to claim 6, wherein the radio base station is part of an LTE system.

9. A handover control method, comprising:
deciding, by a radio base station, a radio communication system of handover destination among a plurality of radio communication systems based on a communication service being used by a radio terminal and a table indicating a correspondence relation between a classification of the communication service and the plurality of radio communication, said deciding including:
determining offset information corresponding to the communication service being used by the radio terminal;
transmitting a measurement configuration to the radio terminal including the offset information;
receiving a measurement report from the radio terminal, the measurement report being adjusted by the radio terminal based on the offset information; and
deciding the radio communication system of handover destination based on the adjusted measurement report; and
transmitting a command for a handover toward a radio base station of the decided radio communication system to the radio terminal, wherein
in the table, each of the plurality of radio communication systems corresponds to the classification of the communication service according to an attainable communication rate of each of the plurality of radio communication systems.

10. The radio base station according to claim 9, wherein the radio base station is part of an LTE system.

11. A handover control method, comprising:
deciding, by a radio base station, a radio communication system of handover destination among a plurality of radio communication systems based on a communication rate of radio communication between a radio terminal and the radio base station, and a table with respect to an attainable communication rate of each of the plurality of radio communication systems, said deciding including:
determining offset information corresponding to the communication rate being used by the radio terminal;
transmitting a measurement configuration to the radio terminal including the offset information;
receiving a measurement report from the radio terminal, the measurement report being adjusted by the radio terminal based on the offset information; and
deciding the radio communication system of handover destination based on the adjusted measurement report; and
transmitting a command for a handover toward a radio base station of a radio communication system supporting the communication rate measured in the measurement step, from the radio base station to the radio terminal, wherein
the radio base station decides the radio communication system of handover destination as a radio communication system having an attainable communication rate corresponding to the communication rate of the radio communication based on the table.

12. The radio base station according to claim 11, wherein the radio base station is part of an LTE system.

* * * * *

UNITED STATES PATENT AND TRADEMARK OFFICE
CERTIFICATE OF CORRECTION

| | | |
|---|---|---|
| PATENT NO. | : 8,983,473 B2 | Page 1 of 1 |
| APPLICATION NO. | : 13/387564 | |
| DATED | : March 17, 2015 | |
| INVENTOR(S) | : Keiji Murakami et al. | |

It is certified that error appears in the above-identified patent and that said Letters Patent is hereby corrected as shown below:

On the title page item (22) should read: PCT Filed: Jul. 27, 2010

Signed and Sealed this
Twelfth Day of January, 2016

Michelle K. Lee
*Director of the United States Patent and Trademark Office*